R. H. RHEA.
Corn and Cotton Planter.
No. 222,797. Patented Dec. 23. 1879.
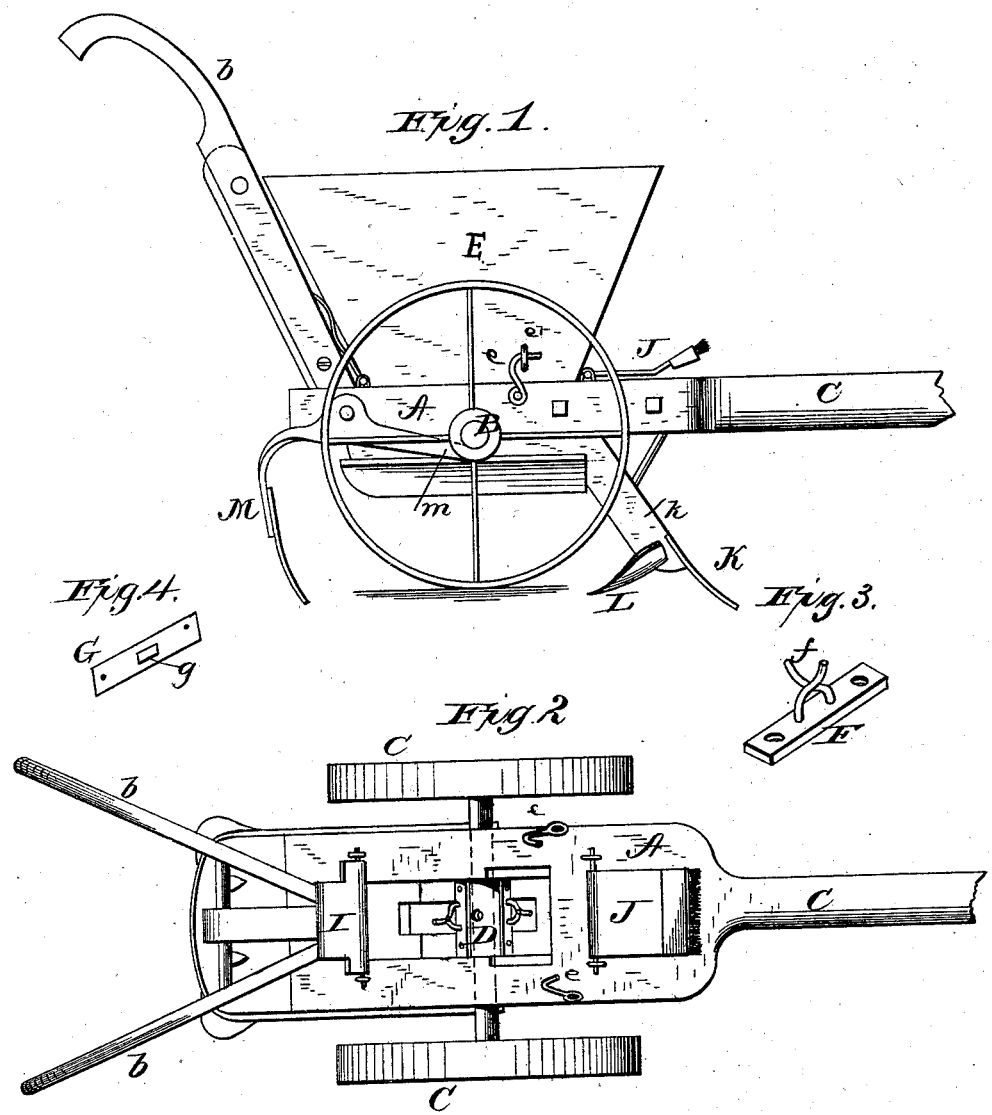

UNITED STATES PATENT OFFICE.

ROBERT H. RHEA, OF DOUGLASSVILLE, TEXAS.

IMPROVEMENT IN CORN AND COTTON PLANTERS.

Specification forming part of Letters Patent No. 222,797, dated December 23, 1879; application filed October 23, 1879.

*To all whom it may concern:*

Be it known that I, ROBT. H. RHEA, of Douglassville, in the county of Cass and State of Texas, have invented certain new and useful Improvements in Corn and Cotton Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 represents a side view of my improved machine; Fig. 2, a top view with the seed-hopper removed. Figs. 3 and 4 are detail views, to be hereinafter referred to.

This invention relates to certain new and useful improvements in the class of machines especially adapted to be converted either into a cotton or corn planter; and to this end the invention consists in the general construction and combination of parts, all as will be hereinafter fully described, and specifically pointed out in the claims.

To enable others skilled in the art to which my invention appertains to make and use the same, I will now proceed to describe its construction and operation.

In the drawings, A represents the main frame of the machine, and B a shaft passing transversely through it, and upon which are mounted the wheels C C, and also centrally thereon the seed-cylinder D, over which and upon the frame A is mounted the removable hopper E, secured thereto by the hooks $e\ e$ engaging with the staples $e'\ e'$. F represents a series of transverse metallic straps set into and secured upon the seed-cylinder at equal distances apart around the same, which are provided with spikes $f$, for the purpose of drilling cotton-seed. G represents a series of interchangeable straps provided with openings $g$, for the reception of the seed when planting corn. I represents a pivoted cut-off, and J a pivoted brush for regulating and controlling the quantity of seed passing from the hopper to the seed-cylinder when planting corn, and which are thrown back out of the way when planting or drilling cotton-seed, as clearly shown in Fig. 2.

The bottom of the frame A, under the seed-cylinder, is provided with adjustable slides, for regulating the quantity of seed to be sown when drilling cotton-seed.

K represents the plow or shovel for forming the furrow, secured to the beam $k$, and L represents a scraper arranged in rear of the plow, for smoothing out the furrow formed by the plow.

M represents the scraper or coverer, pivoted to the sides of the rear portion of the frame A, and which is provided with arms $m\ m$, projecting forward under the axle or shaft B, for the purpose of preventing the scraper or coverer falling too low when lifting up the rear end of planter.

The planter is provided with the usual handles $b$, for guiding the same, and also a tongue, $c$.

When using the machine as a corn-planter, the straps G are used in place of the straps F, and the valve or cut-off I and brush J turned over upon the cylinder, so that it will drop the corn in hills in the usual manner; and when using the machine for drilling cotton-seed, the straps F, with the spikes $f$, are used in place of the straps G, and the cut-off and brush turned over out of the way, as before referred to.

Having thus fully described my invention, what I claim as new, and desire to secure by Letters Patent, is—

1. In cotton-seed and corn planter, the combination of the interchangeable metallic straps F $f$ and G $g$, the seed-cylinder D, and pivoted cut-off I and pivoted brush J, substantially as and for the purpose herein shown and described.

2. In a combined cotton-seed and corn planter, the interchangeable metallic straps F $f$ and G $g$, the seed-cylinder D, pivoted cut-off I, pivoted brush J, plow K, scraper L, and pivoted coverer M, the several parts constructed and arranged to operate substantially as shown and described.

In testimony that I claim the foregoing I have hereunto set my hand this 24th day of June, 1879.

ROBERT H. RHEA.

Witnesses:
J. E. MORRIS,
A. T. HELDT.